United States Patent [19]

Negre

[11] Patent Number: 4,574,749

[45] Date of Patent: Mar. 11, 1986

[54] COUNTERBALANCED PISTON ROTARY MACHINE

[75] Inventor: Guy Negre, Vinon/Verdon, France

[73] Assignee: Elf France, Paris, France

[21] Appl. No.: 601,985

[22] Filed: Apr. 19, 1984

[30] Foreign Application Priority Data

Apr. 21, 1983 [FR] France ................. 83 06611

[51] Int. Cl.⁴ ................. F01L 7/00; F02B 75/06
[52] U.S. Cl. ................. 123/80 R; 123/192 B;
123/190 A; 74/603
[58] Field of Search ........ 123/192 B, 192 R, 190 BD,
123/190 A, 80 BA, 73 V, 59 AL, 80 R, 190 R;
74/603, 604

[56] References Cited

U.S. PATENT DOCUMENTS

| 973,140 | 10/1910 | Sergeant | 123/73 V |
| 1,383,075 | 6/1921 | Clark | 123/190 BD |
| 3,903,995 | 9/1975 | Irgens | 123/192 B |
| 3,995,610 | 12/1976 | Nakamura et al. | 123/192 B |
| 4,000,666 | 1/1977 | Ito et al. | 123/192 B |
| 4,116,189 | 9/1978 | Asaga | 123/80 BA |
| 4,414,934 | 11/1983 | Vogl et al. | 123/192 B |

FOREIGN PATENT DOCUMENTS 1188364 3/1965 Fed. Rep. of Germany ... 123/192 B
6655 of 1914 United Kingdom .......... 123/80 BA Primary Examiner—Charles J. Myhre
Assistant Examiner—David A. Okonsky
Attorney, Agent, or Firm—Burgess, Ryan & Wayne

[57] ABSTRACT

Counterbalancing device in a rotary machine comprising at least one piston axially movable in a cylinder, such as a heat engine and equipped per cylinder with at least one rotating distributor. The distributor, on the one hand, is driven in rotation at the same angular speed as the crankshaft of the machine and in the opposite direction to it and, on the other hand, comprises a counterbalancing compensating mass, of at least one part of the primary inertia of the piston-connecting rod-crank assembly corresponding to the cylinder. Application to the counterbalancing of monocylindrical engines with a crankshaft of reduced bulkiness.

6 Claims, 5 Drawing Figures

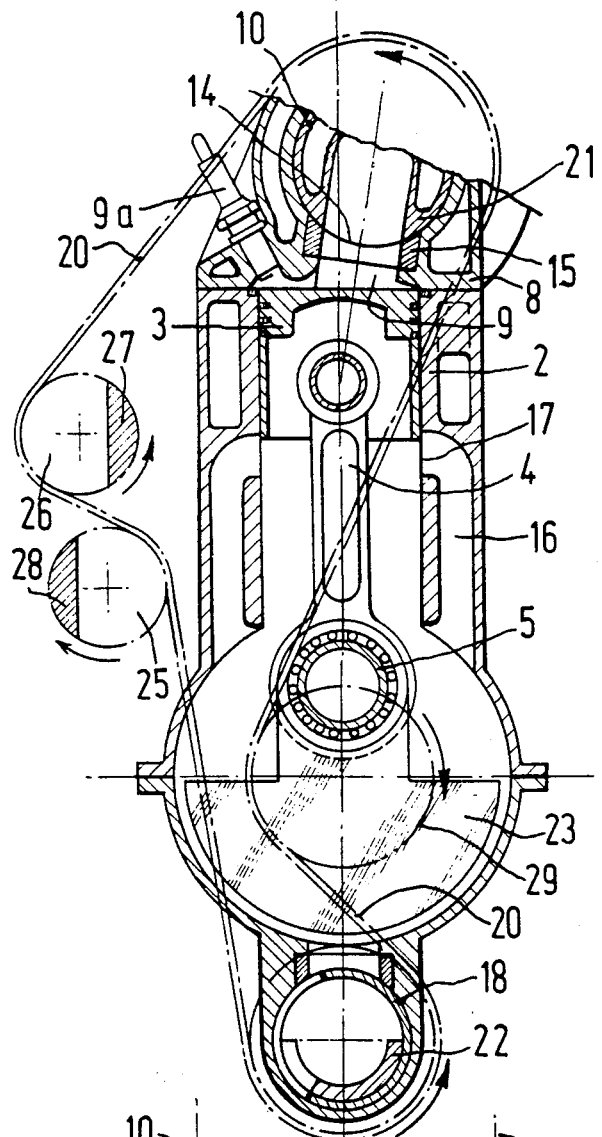
FIG.2
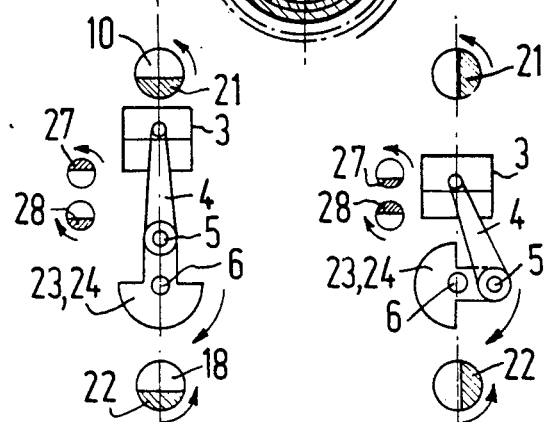 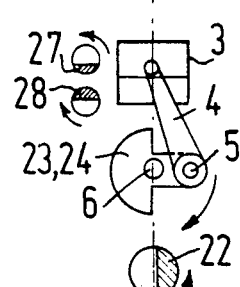 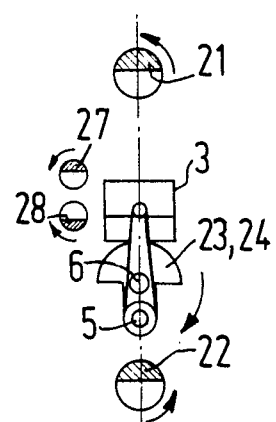
FIG.3a  FIG.3b  FIG.3c

COUNTERBALANCED PISTON ROTARY MACHINE

BACKGROUND OF THE INVENTION

The present invention concerns a process and a device for counterbalancing the inertia forces in a rotary machine comprising at least one piston axially movable in a cylinder, such as a heat engine, and each cylinder of which is fitted with at least one rotating intake and/or exhaust distributor.

In reciprocating piston machines such as internal combustion engines or compressors, the forces due to the pressures of the gases in the combustion chamber as well as the inertia forces corresponding to the movement of the mobile elements such as pistons, connecting rods, cranks, crankshafts are continuously variable throughout the rotation cycle.

Although the compression forces may be counterbalanced in the frame or body of a motor this is not the case of the forces which are transmitted to the motor body and must be, if not removed, at least considerably reduced, in order to ensure a rotation of the motor that does not interfere too much with its surroundings by transmitting the vibrations caused by its rotation and does not risk prematurely wearing out the motor and its attachments to a support element such as a vehicle.

In order to limit the vibrations of the piston machines caused by their own rotation, it is known to compensate the irregular distribution of the masses about the axis of rotation by counterweights principally provided on the crankshaft of the motor, opposite facing, with respect to the axis of rotation of the crankshaft, to the crank of the piston and to the connecting rod and piston that are pivotally connected to it. Such a counter balancing is always difficult since the size and the position of the counterweights can often only be exactly determined by successive experimentations, and, furthermore, the counterweights cannot always be easily housed in the crankcase of the machine.

Such a situation is to be found, especially, in monocylindrical motors or compressors where thhe crank connecting the rod to the crankshaft must present a maximal stiffness with very bulky bearings, such as roller bearings, that practically prohibit housing in the crankcase counterweights of a volume sufficient to counterbalance the unbalance equivalent with the elbow of the crankshaft and the connecting rod that it supports.

One of the aims of the present invention is precisely to allow to reduce the bulkiness of the compensating counterweights housed in the sealed crankcase of the crankshaft by utilizing, as counterweight supports, rotating elements mechanically connected to this crankshaft.

SUMMARY OF THE INVENTION

With this purpose, in the counterbalancing process of the inertia forces in a rotary machine comprising at least one piston axially displacable in a cylinder, such as a heat engine and each cylinder of which is equipped by at least one rotating intake and/or exhaust distributor, and a principal partial counterbalancing mass fixed on the crankshaft opposite the crank-pin of the connecting rod of the piston, according to the invention, at least one secondary counterbalancing mass that is interacting with the principal counterbalancing mass in order to balance the primary inertia force of the motor-connecting rod-crank assembly, is carried back as a compensating mass on this distributor which is driven in rotation in the opposite direction to the direction of rotation of the crankshaft of the machine and in angular synchronism with this crankshaft, in such a way as to balance the rotating inertia and the axial inertia of the whole of the machine.

In order to reduce or supress the inertia torques on the distributors, the line joining the axis of the intake rotating distributor and the axis of exhaust rotating distributor is made to pass substantially through the rotation axis of the crankshaft. The compensating mass is disposed on the distributor in such a way that it is in the lower dead point when the piston is at the end of the compression stroke (minimum volume in the cylinder chamber) and in the upper dead point when the piston is at the end of the power stroke and respectively to the right when the principal counterbalancing mass is to the left and vice versa.

According to another embodiment of the invention, when the admission rotating distributor and/or the exhaust rotating distributor comprises a transverse passage, it is inclined with respect to the axis of the cylinder in order to allow the passage to be open completely only once per revolution of the crankshaft in spite of the speed of rotation of the distributor being equal to that of the crankshaft and in a direction of rotation opposite to that of the crankshaft.

In order to realize a more complete counterbalancing of the inertia forces, in the counterbalancing process in which a kinematic coupling with the crankshaft of the rotating machine such as a chain or notched belt, also drives a rotary mass such as at least one pulley or stretcher gear, at least a part of the counterbalancing masses of the secondary inertia forces (forces in 2 $\omega t$) of the piston-connecting rodcrank assembly is carried back as a compensating mass on this rotary mass which is driven at a rotation speed which is twice that of the crankshaft of the rotating machine.

In order to further improve the counterbalancing, the single rotary mass can be replaced by two counter-rotating masses each provided with a compensating mass and substantially identical in order to cancel out the tilting torques of the compensating masses. The counter-rotating masses are, preferably, disposed in diametrically opposed positions and alternately in high and low position when the secondary counterbalancing mass(es) is (are) in high position and low position.

The device for operating the process according to the invention in a rotary machine comprising at least one piston axially displacable in a cylinder such as a heat engine and equipped per cylinder with at least one intake rotating distributor and/or an exhaust rotating distributor and a principal partial counterbalancing mass fixed on the crankshaft opposite the crankpin of the connecting rod of the piston, is such that the distributor, on the one hand, is driven in rotation and at the same angular speed as the crankshaft of the machine and in the opposite direction to the direction of rotation of this crankshaft by a kinematic coupling with this crankshaft such as a chain or doublenotched belt and, on the other hand, comprises a compensating mass for counterbalancing of at least one part of the primary inertia forces of the piston-connecting-crank assembly corresponding to the cylinder.

As mentioned herein-above for the process according to the invention, the axis of the intake rotating distributor and the axis of the exhaust rotating distributor pass substantially through the axis of rotation of the crankshaft and the compensating mass is disposed on the distributor in such a way that it is in the lower dead point when the piston is at the end of the compression stroke (minimum volume in the cylinder chamber) and in the higher dead point when the piston is at the end of the power stroke and respectively to the right when the principal counterbalancing mass is to the left and vice versa.

When the intake rotating distributor and/or the exhaust rotating distributor comprise a transverse passage, this passage is inclined with respect to the axis of the cylinder in order to allow the passage to be opened completely only once per revolution of the crankshaft in spite of the speed of rotation of the distributor being equal to that of the crankshaft and of its direction of rotation opposite that of the crankshaft.

According to another embodiment of the device according to the invention in which a kinematic coupling with the crankshaft of the rotating machine such as a chain or notched belt, equally drives a rotary mass such as a stretcher pulley or pinion the rotary mass, on the one hand, is driven in rotation at an angular speed that is twice that of the crankshaft of the rotary machine and, on the other hand, comprises a compensating mass for counterbalancing at least part of the secondary inertia (in $2 \omega t$) of the piston-connecting rod-crank assembly corresponding to the cylinder. In this latter embodiment, the rotating machine preferably comprises, instead of a single rotary mass rotating at an angular speed twice that of the crankshaft two counter-rotating masses, each provided with a counterbalancing compensating mass and substantially identical in order to cancel out the tilting torques of the compensating masses and the counter-rotating masses are disposed in diamtrically opposed positions and alternately in high position and low position when the counterbalancing mass(es) is (are) in low position and high position.

BRIEF DESCRIPTION OF THE DRAWINGS

Other aims, advantages and characteristics will appear from reading the following description of one embodiment of the invention, given by way of non-limitative example with reference to the annexed drawings in which:

FIG. 2 is a cut away schematic section view along line I–II, of the motor represented in FIG. 1 with the kinetic couplings represented on a larger scale than shown in FIG. 1 and in chain and dotted lines;

FIGS. 3a to 3c are schematic representations of the different positions of the counterbalancing compensating masses of the motor of FIGS. 1 and 2 with respect to the various positions of the piston and the crankshaft.

DESCRIPTION OF THE PREFERRED EMBODIMENTS

Figure 1:
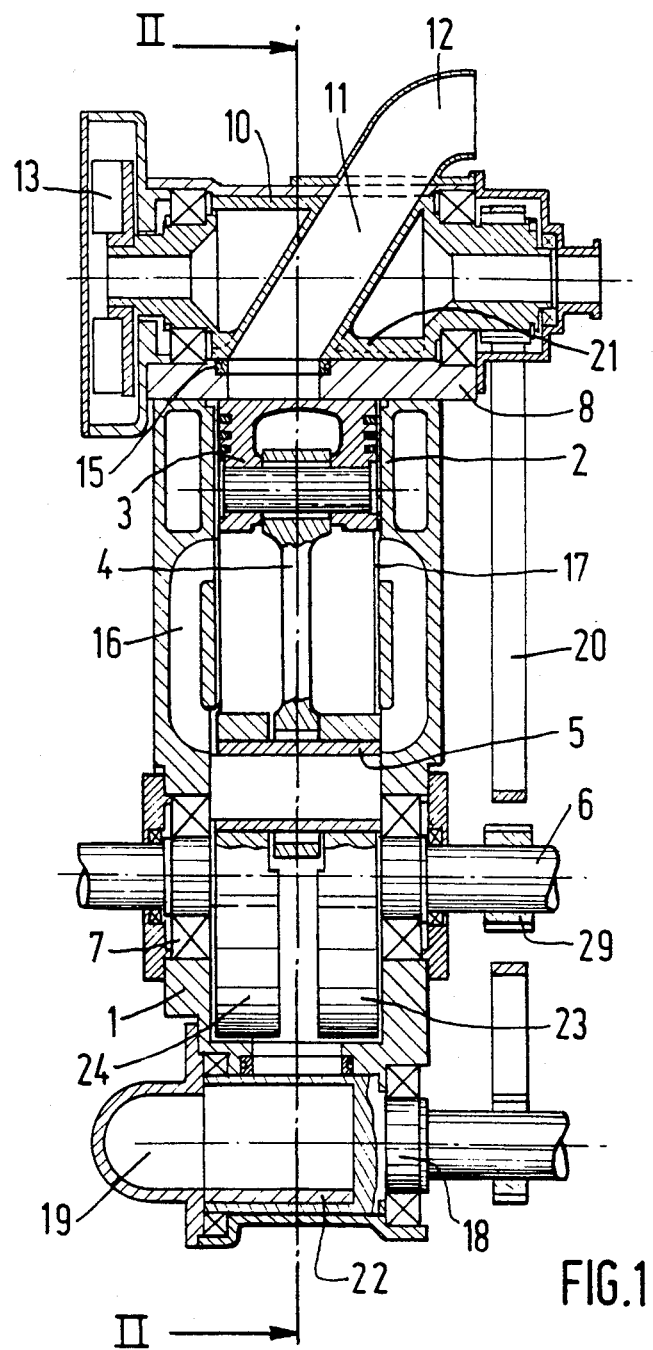
FIG. 1 represents a section along the axis of the crankshaft, of a controlled ignition motor provided with a counterbalancing compensating mass on its rotating distributors.

The mono-cylinder heat engine operating as a two-stroke engine, and represented in FIGS. 1 and 2, comprises essentially, in a body or motor block 1 of several assembled parts; a cylinder 2, a piston 3 connected by a connecting rod 4 and a pin or crank 5 to a crankshaft 6 rotary mounted on bearings 7 such as ball bearings or roller bearings. The crankshaft 6 is mechanically connected to an element to be driven rotatively such as a vehicle driving-axle or an aeroplane propellor (not represented).

The body 1 comprises a cylinder head 8 for closing a combustion chamber 9 delimited by the piston 3. In the cylinder head 8 is housed a rotary exhaust distributor 10 diagonally through crossed by an exhaust passage 11 that, at each complete revolution, can connect by a wide section passage, the combustion chamber 9 to an exhaust pipe 12 towards the outside. The diagonal disposition of the exhaust passage 11 can prevent, after a half turn of rotation of the distributor 10, the combustion chamber from being connected to the exhaust pipe 12. The rotary distributor 10 is cooled by a water circuit activated by a centrifugal pump 13 and therefore does not risk seizing up in its support and guiding housing 14 or on its sealing ring 15 pushed on the outside cylindrical surface of the distributor by the pressure prevailing in the combustion chamber 9 on which emerges a sparking plug 9a or a motor-fuel injector screwed on the wall of the cylinder head 8.

The air inlet (where necessary enriched with vaporized motorfuel) of the combustion chamber 9 is achieved from the crankcase of the crankshaft 6 by lateral passages 16 provided between the intake ports in the body 1 inside the crankcase and injection ports 17 emerging in the wall of the cylinder 2 and normally sealed by the piston 3 except when the piston is at the end of the power stroke (lower dead point).

The crankcase is air boosted by a volumetric or turbine compressor, in which case no distributor is necessary, or is fed by the vacuum produced in the crankcase by the raising of the piston towards the end of the compression stroke (upper dead point) according to the two stroke cycle. In this latter case, a rotating intake distributor 18 is rotary mounted in the crankcase, in order to connect this crankcase to an air admission pipe 19 when the piston 3 rises towards the end of the compression stroke (upper dead point) and to isolate the crankcase once the piston moves down again, as seen in FIG. 2, in order to allow piston 3 to pressurize the crankcase during its downward displacement towards the end of the power stroke (lower dead point).

According to the invention, the exhaust rotary distributor 10 and the intake rotary distributor 18 are disposed on a line passing through the axis of the crankshaft 6 and are driven in rotation by a notched belt 20 in the opposite direction to the direction of rotation of the crankshaft 6 and at equal angular speed of rotation and each possesses a compensating mass, respectively 21 for the distributor 10 and 22 for the distributor 18, directed towards the bottom of FIGS. 1 and 2 when the piston 3 is at upper neutral position and towards the top when this piston is at lower neutral position, as represented in FIGS. 3a to 3c.

In order to allow the correct driving of the distributors 10 and 18, gears having the same primitive diameter are rotatively fixed on the crankshaft 6 and on the driving axes of these distributors and the notched belt 20 envelops the gear of the crankshaft pinion 29 and possesses notches on its two faces or is replaced by a chain.

Compensating masses 21 and 22 of the rotary distributors participate with the counterweights 23 and 24 of the crankshaft 6, towards counterbalancing of the primary inertia of the mobile assembly of the motor: piston 3, connecting rod 4, crankshaft (5 and 6) with its counterweights. The presence of counterbalancing masses on the distributors 10 and 18 allows to reduce to a minimum the space occupied by the crankshaft in its case without having to take into account, for this, counterbalancing restrictions.

According to another important characteristic of the invention, the motor is equipped with auxiliary rotary masses 25 and 26 operating, for example, as a stretcher of the belt 20 and equipped with counterbalancing masses 27 and 28 in order to balance the secondary inertia (in 2 ωt) of the mobile assembly of the motor. The rotating masses are placed on either side of the belt 20 so as to be driven in opposite directions at a speed that is twice the rotation speed of the crankshaft 6 to be applied only to the secondary inertia without any other interference effect.

In order to be driven at a rotation speed twice that of the motor, the rotary masses 25 and 26 are either connected to pinions having primitive diameters half that of the crankshaft pinion 29, or connected to this crankshaft 6 by an appropriate mechanical transmission independent of that driving the rotary distributors 10 and 18.

The various positions adopted by the counterbalancing compensating masses during rotation of the motor are schematically represented in FIGS. 3a to 3c. FIG. 3a shows that the piston 3 is at the end of the compression stroke as represented in FIGS. 1 and 2, at the instant where either the beginning of the motor-fuel injection in the combustion chamber 9, is carried out or the ignition by plug 9a of the carburated and compressed mixture contained in this combustion chamber 9 is carried out. In this position at the end of the compression stroke of the piston 3, the compensating masses 21 and 22 of the distributors 10 and 18 that rotate in the opposite direction to that of the crankshaft 6, are situated in the low part of these distributors according to the drawing and the compensating masses 27 and 28 of the counterbalancing rotary masses of the second order, are alternately oriented towards the top and the bottom of the drawing.

FIG. 3b represents the moving contacts after a quarter turn of the crankshaft during the downward displacement of the piston 3 towards the end of the power stroke (lower dead point) under the gas pressure prevailing in the combustion chamber 9 after ignition of the combustible mixture that it contains.

The compensating masses 21 and 22 have also rotated a quarter turn in the opposite direction to that of the crankshaft and are positioned at the side of the connecting rod head surrounding the crank pin 5. The compensating masses 27 and 28 of the second order inertia have exchanged their position by rotating in the opposite direction with respect to each other.

Similarly, FIG. 3c represents schematically the moving parts of the motor at the end of the power stroke of the piston 3, where it can be seen that counterbalancing compensating masses 21 and 22 of the primary inertia are positioned at the top of their corresponding distributors 10 and 18 with respect to the drawing in order to associate their action to that of the counterweights 23 and 24 integral with the crankshaft. The counterbalancing compensating masses 27 and 28 of the secondary inertia have again exchanged their relative positions and have come back to the position they occupied at the end of the compression stroke (upper dead point).

The cycle continues by the passage of the connecting rod head in quarter turn position towards the left (not represented) during the upward displacement of the piston 3 towards the end of the compression stroke, position of the beginning of which the fresh compression gases in the crankcase (of the most reduced volume possible due to the reduction of the volume of the counterweights 23 and 24) are forced within the combustion chamber 9 by the lateral passages 16 and the cylinder ports 17 open when the piston is in lower position.

The counterbalanced mono-cylinder motor according to the invention thus presents practically no vibrations due to the inertia of the mobile masses since, not only the very strongly eccentric mass of its crankshaft and its connecting rod is counterbalanced but, furthermore, the second order inertia, relatively important for such motors, are counterbalanced by auxiliary counterbalancing masses 25 and 26. The counterbalancing according to the invention only necessitates slight mechanical complications since it utilizes the distribution belt or chain that is, any way, indispensable for such high performance engines operating according to two or four stroke cycles, with or without supercharging.

The counterbalancing of motors, according to the invention, allows to replace four or six cylinder motors normally utilized in aeronautics or automotive building by mono or bicylinder engines which give better performances with respect to yields, weight and also, for small series production, manufacturing cost.

Such a counterbalancing can be applied to other reciprocating piston machines such as gas compressors or liquid pumps.

Of course, the present invention is in no way limited to the embodiments described and represented herein and it is adaptable to numerous variants available to the man skilled in the art, without departing from the scope and spririt of the said invention.

I claim:

1. An inertia force balancing system for a reciprocating piston engine comprising at least one cylinder having a piston moving axially therein, said piston connected to a crankshaft by means of a connecting rod and a crankpin, the crankshaft having an unbalanced mass fixed on the crankshaft opposite the crankpin for balancing primary inertia forces, said engine having at least one intake rotating distributor and at least one exhaust rotating distributor arranged in communication with each cylinder, the rotating distributors being driven at an angular speed equal to that of the crankshaft but in an opposite direction by a kinetic coupling to the crankshaft, each rotating distributor comprising an auxiliary balance mass for complementary balancing of the primary inertia forces of the engine wherein the auxiliary balance masses are disposed on the rotating distributors in such a way that each of said balancing masses is in its lowest position when the piston is at TDC, in its highest position when the piston is at BDC, at a rightmost position when the crankshaft unbalanced mass is at its leftmost position and at a leftmost position when the crankshaft unbalanced mass is at its rightmost position and wherein a plane joining the axis of rotation of the intake distributor to the axis of rotation of the exhaust distributor passes substantially through the axis of rotation of the crankshaft.

2. An inertia force balancing system for a reciprocating piston engine comprising at least one cylinder having a piston moving axially therein, said piston connected to a crankshaft by means of a connecting rod and a crankpin, the crankshaft having an unbalanced mass fixed on the crankshaft opposite the crankpin for balancing primary inertia forces, said engine having at least one rotating distributor arranged in communication with each cylinder, the rotating distributor being driven at an angular speed equal to that of the crankshaft but in an opposite direction by a kinetic coupling to the crankshaft, the rotating distributor comprising an auxiliary balance mass for complementary balancing of the primary inertia forces of the engine wherein the auxiliary balance mass is disposed on the rotating distributor in such a way that it is in a lowest position when the piston is at TDC, in a highest position when the piston is at BDC, at a rightmost position when the crankshaft unbalanced mass is at its leftmost position and at a leftmost position when the crankshaft unbalanced mass is at its rightmost position wherein the rotating distributor comprises a diagonal passage, inclined with respect to the axis of the cylinder, to permit that passage to open completely only once during each revolution of the crankshaft.

3. An inertia force balancing system for a reciprocating piston engine comprising at least one cylinder having a piston moving axially therein, said piston connected to a crankshaft by means of a connecting rod and a crankpin, the crankshaft having an unbalanced mass fixed on the crankshaft opposite the crankpin for balancing primary inertia forces, said engine having at least one rotating distributor arranged in communication with each cylinder, the rotating distributor being driven at an angular speed equal to that of the crankshaft but in an opposite direction by a kinetic coupling to the crankshaft, the rotating distributor comprising an auxiliary balance mass for complementary balancing of the primary inertia forces of the engine wherein the auxiliary balance mass is disposed on the rotating distributor in such a way that it is in a lowest position when the piston is at TDC, in a highest position when the piston is at BDC, at a rightmost position when the crankshaft unbalanced mass is at its leftmost position and at a leftmost position when the crankshaft unbalanced mass is at its rightmost position and wherein the kinetic coupling device drives a rotating element at an angular speed which is twice the angular speed of the crankshaft, said rotating element comprising a secondary balance mass for balancing at least a part of the secondary inertia forces of the engine.

4. A device of claim 3, wherein the rotating element comprises two counter rotating parts each provided with a substantially similar balance mass to cancel out a tilting torque.

5. A device of claim 4, wherein the counter rotating parts are disposed in diametrically opposed positions.

6. A device of claim 5, wherein the counter rotating parts have their balance masses alternately disposed in high and low positions when the auxiliary balance mass of the distributor is in a high position and a low position.

* * * * *